May 14, 1968

P. J. HACKBARTH ET AL 3,382,741

APPARATUS FOR MACHINING BALLS

Filed May 25, 1966

INVENTORS
PAUL J. HACKBARTH
JACOB S. DOTY

BY *Olsen and Stephenson*
ATTORNEYS

May 14, 1968     P. J. HACKBARTH ET AL     3,382,741
APPARATUS FOR MACHINING BALLS

Filed May 25, 1966     2 Sheets-Sheet 2

INVENTORS
PAUL J. HACKBARTH
JACOB S. DOTY

BY *Olsen and Stephenson*
ATTORNEYS

United States Patent Office 3,382,741
Patented May 14, 1968

3,382,741
APPARATUS FOR MACHINING BALLS
Paul J. Hackbarth and Jacob S. Doty, Middletown, Ohio, assignors to Hoover Ball and Bearing Company, Saline, Mich., a corporation of Michigan
Filed May 25, 1966, Ser. No. 552,798
5 Claims. (Cl. 77—21)

This invention relates generally to apparatus for machining balls and more particularly to improved apparatus for machining an opening of a predetermined configuration in a ball.

Balls with precision machined openings or passages of a particular configuration are becoming increasingly desirable for many purposes. For example, a ball with a stepped opening and a flat surface at the large end of the opening is used in the fuse mechanism for certain shells. Simple apparatus which is operable automatically to form special precision machining operations of this type on balls, without leaving undesirable burrs and rough edges, is, therefore, desirable. It is an object of this invention, therefore, to provide improved apparatus capable of machining balls to form this type of precision opening therein.

A further object of this invention is to provide automatically operable machining apparatus which can be operated to form a stepped opening in a ball and a flat surface on the exterior of the ball at the large end of the stepped opening, without leaving burrs and rough edges.

Further objects, features and advantages of this invention will become apparent from a consideration of the following description, the appended claims, and the accompanying drawing in which:

Figure 1:
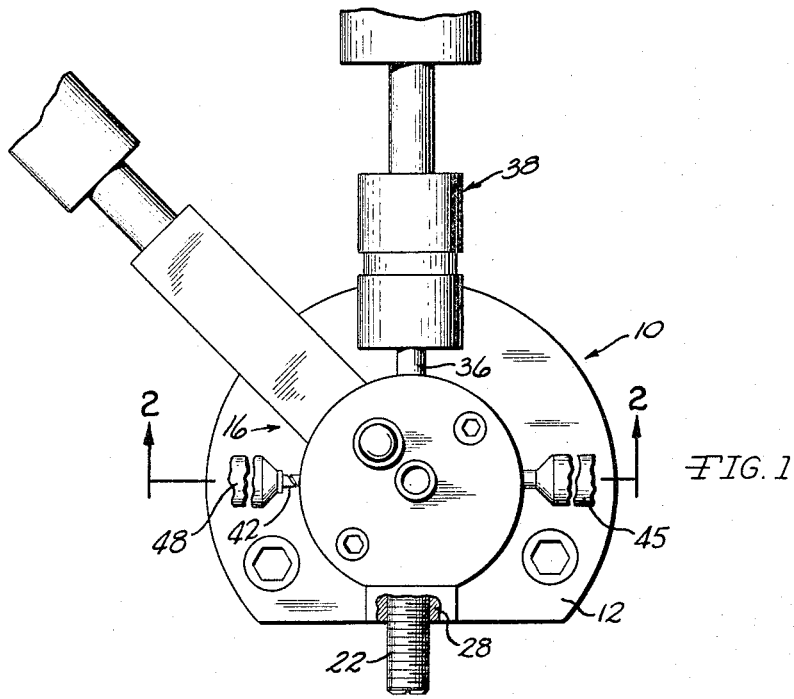
FIGURE 1 is a plan view of the improved machining apparatus of this invention.
Figure 2:
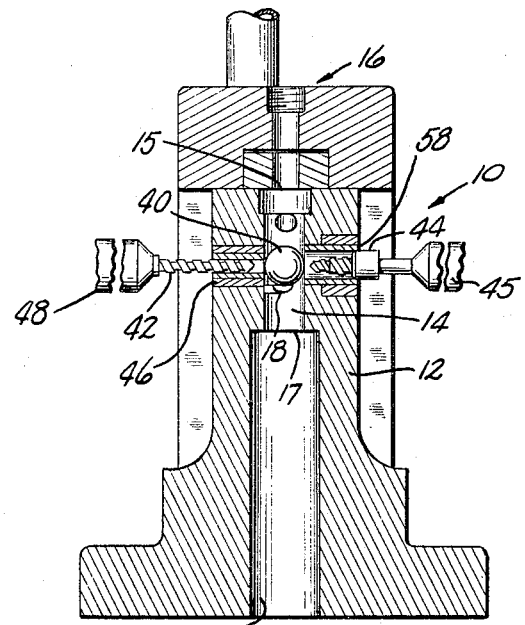
FIGURE 2 is a transverse sectional view of the apparatus of this invention, looking substantially along the line 2—2 in FIG. 1 and showing a ball in position to be machined.

With reference to the drawing, the improved machining apparatus of this invention, indicated generally at 10, is illustrated in FIGS. 1 and 2 as including a body 12 formed with an upright opening or passage 14 which extends therethrough. A ball feeding mechanism, indicated generally at 16, operates to automatically deliver solid balls to the upper or feeding end 15 of the passage 14 for travel downwardly to a supported position on a ball supporting member 18 which projects into the passage 16. After the apparatus 10 has operated to machine a ball, indicated at 40, the supporting member 18 is retracted so that the machined ball drops downwardly through the bottom end of opening 14 into an enlarged ball discharge passage 20. The ball supporting member is subsequently returned to its position shown in FIG. 2 at which time the feeding assembly 16 deposits another solid ball to be machined thereon. Since the ball feeding mechanism 16, by itself, forms no part of the present invention, further detailed description thereof is believed to be unnecessary. The ball feeding mechanism 16 is fully described in copending application Ser. No. 400,089, now Patent No. 3,303,727, assigned to the assignee of this application and such description is incorporated herein by reference.

Figure 3:
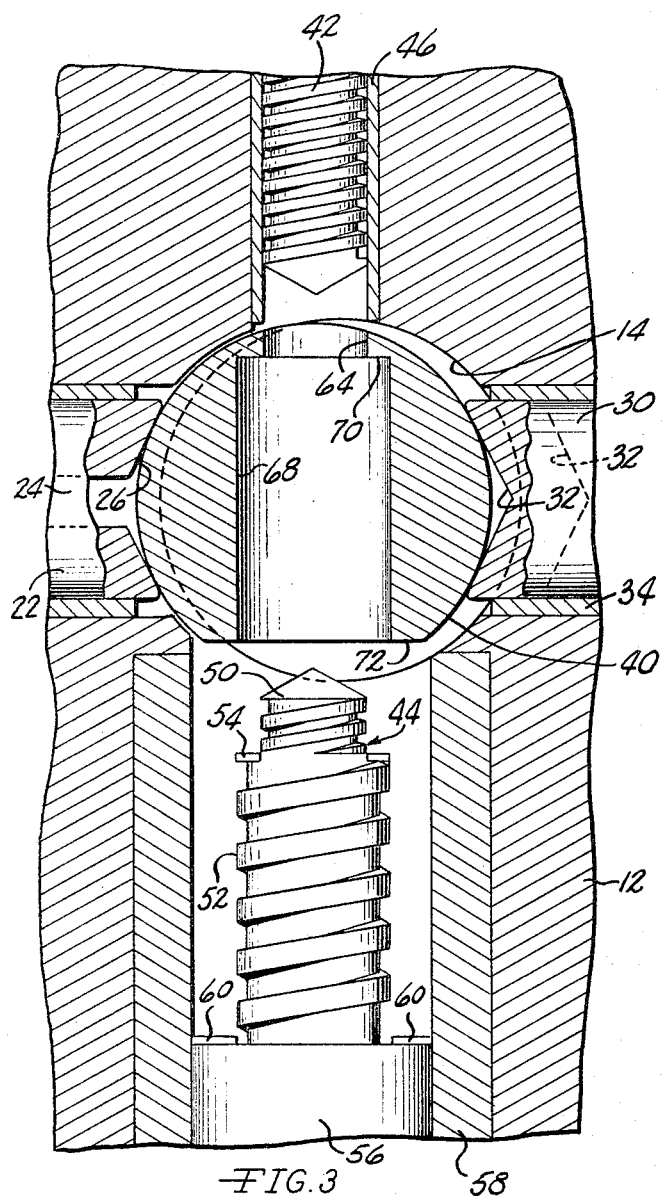
FIGURE 3 is a fragmentary longitudinal sectional view of the apparatus of this invention showing a finished ball that has been machined in the apparatus of this invention.

An anvil member 22 (FIG. 3) having an axial air hole 24 extended therethrough is supported on the body 12 at a position in substantial horizontal alignment with a ball supported on the supporting member 18. The anvil 22 has a concavely recessed face 26 disposed adjacent the passage 14 and is threadably supported on a threaded section 28 of the body 12 so that the position of the concave face 26 is adjustable. Disposed diametrically opposite the anvil 22 and in alignment therewith is a plunger 30 having a concavely recessed face 32 similar to the anvil face 26. The plunger 30 is supported on a sleeve bearing 34 in the body 12 and is movable toward and away from the anvil 22 by a piston rod 36 which forms a part of a fluid operated cylinder assembly 38. As shown in FIG. 3, the plunger 30 is movable toward the anvil 22 so as to clamp a ball 40 therebetween. The position of the anvil face 26 is adjusted so that when the ball 40 is clamped in the position shown in FIG. 3 the ball has an axis which is aligned with a first drill 42 and a machine tool 44.

The drill 42 extends through a drill bushing 46 in the body 12 and is reciprocated by means of a cylinder assembly, a portion of which is indicated at 48 in FIG. 1. The machine tool 44, which is similarly reciprocated by means such as a cylinder assembly, a portion of which is shown at 45 in FIG. 1, has a terminal end section 50 of a diameter substantially equal to the diameter of the drill 42. Rearwardly of the terminal end section 50, the tool 44 has an enlarged drill section 52, and at the juncture of the sections 50 and 52 the tool 44 is provided with milling cutters 54 which extend transversely of the tool axis. Rearwardly of the drill section 52, the tool 44 has another enlarged section 56 which is journaled in a drill bushing 58 in the body 12. The section 56 is a non-drilling cylindrical section, and at the juncture of the section 52 and 56 the tool 44 is provided with additional milling cutters 60.

In the operation of the apparatus 10, assume that a solid ball 40 has been delivered by the feeding mechanism 16 to the passage 14 and has fallen into a supported position on the member 18. At this time the clamp plunger 30 is in its broken line position shown in FIG. 3 in which it is withdrawn relative to the anvil 22. The cylinder assembly 38 is then operated to move the plunger 30 toward the anvil 22 so as to move the ball 40 onto the anvil face 26, in which position the ball 40 is clamped between the anvil surface 26 and the plunger surface 32. It is to be noted from FIG. 3 that the ball 40, in this position, is axially offset somewhat from the passage 14. This offset is due to the concave anvil surface 26 and is necessary to provide for freedom of movement of the ball 40 onto the surface 26 and then off the surface 26 for downward travel through the passage 14.

Figure 4:
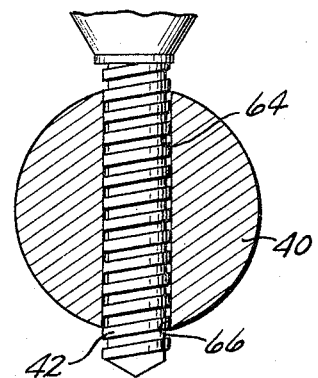
FIGURE 4 is a sectional view of a ball showing the forming therein of the opening which is initially formed with the apparatus of this invention.
Figure 5:
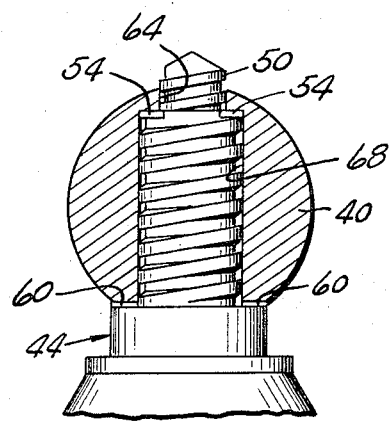
FIGURE 5 is a sectional view of a ball, illustrated similarly to FIG. 4, showing the tool therein which completes the formation of the stepped opening in the ball and forms the flat surface on the ball at the large end of the opening.

The cylinder assembly 48 is operated to first advance the drill 42 through the ball 40, as illustrated in FIG. 4, to form an opening 64 diametrically through the ball 40 of a size corresponding to the diameter of the drill 42. The drill 42 is then retracted simultaneously with advance of the tool 44 into the end 66 of the opening 64. The tool section 50 corresponds in diameter to the diameter of the opening 64 so that it performs no machining operation on the ball 40 but pilots the tool 44 into the opening 64. As the tool 44 is advanced into the opening 64, the drill section 52 drills a larger opening 68 in the ball 40 starting at the end 66 of the opening 64, as shown in FIG. 5. The tool 44 is advanced to a precise position in which the milling cutters 54 form a shoulder 70 in the ball 40 at the juncture of the opening 68 and 64 (FIG. 3). In this position of the machine tool 44, the milling cutters 60 have formed a flat exterior surface 72 on the ball 40 at the outer end of the opening 68. The tool 44 is then retracted, being shown in only a partially retracted position in FIG. 3, the support member 18 and the plunger 30 are retracted, and air is forced through the opening 24 in the anvil 22 to assure release of the ball 40 from the anvil face 26, gravitational force then causing a discharge of the machined ball 40 through the lower end 17 of the passage 14. Another solid ball is then delivered by the mechanism 16, the support member is moved to a position to intercept the ball, and the above cycle is repeated.

From the above description it is seen that this invention provides machining apparatus for forming an opening of a particular configuration in a ball. Since the small drill 42 enters the ball first, it drills a very straight hole 64 in the ball 40 which is accurately located by virtue of the cooperative relation of plunger 30 and anvil 22. This hole 64 is then utilized to guide the larger tool 44 into the ball 40 so as to form the shoulder 70 and the flat surface 72. Since both ends of the openings 64 and 68 in the finished ball have been formed by tools entering, rather than leaving, the ball 40 no burrs or ragged edges are formed on the ball. Furthermore, since the shoulder 70 is formed as a final operation by the larger tool 44, this shoulder is also burr free. Consequently, a very precisely shaped opening is formed in the ball 40, and it is readily apparent that other shaped openings are readily formed in the ball by varying the specific configuration of the machine tool 44.

It will be understood that the apparatus for machining balls which is herein disclosed and described is presented for purposes of explanation and illustration and is not intended to indicate limits of the invention, the scope of which is defined by the following claims.

What is claimed is:

1. Apparatus for machining shaped openings in balls, said apparatus comprising a fixed body, means in said body for supporting a ball to be machined, a pair of clamp members on said body engageable with diametrically opposite sides of a ball in said body so as to exert compressive forces on a ball engaged therebetween to retain said ball in a fixed position in said body, a pair of axially aligned tools disposed on diametrically opposite sides of a ball clamped between said clamp members, one of said tools being a drill of a length to extend diametrically through said ball, means for advancing said drill through said ball and retracting said drill so as to leave a through hole in said ball, the other one of said tools having a terminal end section of a size to be piloted in said hole formed by said drill, said other tool having at least one section of a larger diameter than said drill disposed rearwardly of said terminal end section, and means for advancing said tool into the hole formed in said ball by said drill to enlarge a portion of said through hole.

2. Apparatus according to claim 1 in which said tool is provided at the junctures of said sections with milling means for forming a shoulder in said ball perpendicular to the axis of said through hole.

3. Apparatus according to claim 2 in which said tool is formed with second milling means spaced from said terminal end section and said first milling means for forming a flat surface on said ball at one end of said hole.

4. Apparatus according to claim 1 further including drill bushings mounted in said body in a guiding supporting relation with said tools.

5. Apparatus according to claim 1 in which said body is provided with an upright opening which extends therethrough and said ball supporting means extends into said opening intermediate the upper and lower ends thereof so that balls to be machined can be delivered to the upper end of said opening and machined balls can be discharged through the lower end thereof.

References Cited
UNITED STATES PATENTS

| | | | |
|---|---|---|---|
| 1,643,679 | 9/1927 | Roderick | 77—65 |
| 1,883,993 | 10/1932 | Lee | 77—21 |
| 2,242,169 | 5/1941 | Birkigt | 77—21 |
| 2,667,795 | 2/1954 | Bowen | 77—65 |
| 2,842,015 | 7/1958 | Miller | 77—65 |
| 3,303,727 | 2/1967 | Hackbarth et al. | 77—21 |

GERALD A. DOST, *Primary Examiner.*